Sept. 23, 1947.  G. H. KOCH  2,427,947

SHAFT BEARING CONSTRUCTION

Filed June 15, 1945

WITNESSES:
Louis Necks
E. H. Lutz

INVENTOR
GUSTAV H. KOCH
BY R. J. Eisinger
ATTORNEY

Patented Sept. 23, 1947

2,427,947

UNITED STATES PATENT OFFICE 2,427,947

SHAFT BEARING CONSTRUCTION

Gustav H. Koch, Springfield, Mass., assignor to Westinghouse Electric Corporation, East Pittsburgh, Pa., a corporation of Pennsylvania Application June 15, 1945, Serial No. 599,582

2 Claims. (Cl. 308—166)

My invention relates to an end thrust bearing for a rotating shaft, as, for example, the motor of an electric fan.

One object of the invention is to produce an improved end thrust bearing for a rotating shaft of the type set forth.

A still further object of the invention is to produce an improved, adjustable end thrust bearing by means of which the end thrust is yieldingly resisted so as to prevent binding of the shaft.

Figure 1:
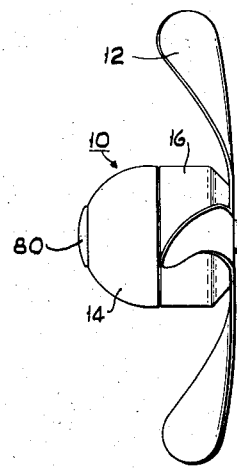
Figure 2:
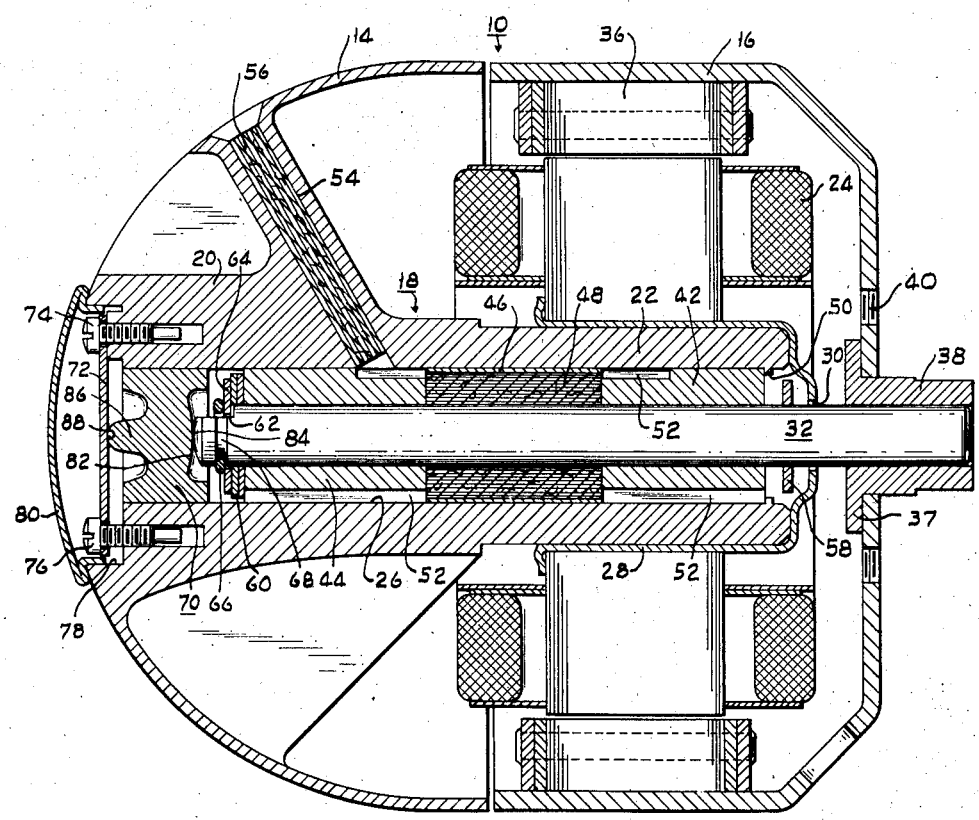

These and other objects are effected by my invention as will be apparent from the following description and claims taken in connection with the accompanying drawings, forming a part of this application, in which:

Fig. 1 is a reduced fragmentary top plan view of an electric fan, the motor shaft of which is provided with an end thrust bearing embodying my invention; and Fig. 2 is an enlarged vertical sectional view of the motor shown in Fig. 1, the fan propeller being omitted.

In Fig. 1 of the drawings, there is shown, by way of example, an electric fan including a motor 10 and a propeller 12 adapted to be rotated by, the motor. It is to be understood that while the invention is illustrated as applied to the shaft of an electric motor, it is equally applicable to any rotating shaft which is subjected to an end thrust.

In the embodiment illustrated in detail in Fig. 2, the motor is enclosed in a housing formed of a stationary shell 14 and a rotary shell 16 which carries the propeller 12. The stationary shell 14 carries, or has integrally formed therewith, an elongated, longitudinally-disposed bearing sleeve 18. The bearing sleeve 18 includes an enlarged rear portion 20, which will hereinafter be further referred to, and a reduced front portion 22 for supporting the stationary field core 24 of the motor. The bearing sleeve 18 also has an internal bore 26 for accommodating a motor shaft and its bearings and the end thrust bearing of my invention.

The field core 24 is carried by a cup-shaped sleeve 28, which is press-fitted over the reduced portion 22 of the bearing sleeve, and has a front opening 30 through which the propeller supporting end of the motor shaft 32 extends.

The rotary shell 16 carries the rotor windings 36 and is secured by spot welding or the like to the flange 37 of a bushing extending through an opening in the front wall of the shell. The bushing 38 carries the propeller 12 and is press- fitted on the front end of the motor shaft 32. The propeller may be further secured to the front wall of the shell 16 by screws or the like engaging tapped holes 40 formed in the front wall of the shell 16.

The shaft 32 rotates in front and rear bearings 42 and 44 which are spaced by a sleeve 46 enclosing a wick 48. The bearings 42 and 44 and the wick enclosing sleeve 46 are press-fitted in the bore 26 of the bearing sleeve 18 and the front end of the bearing sleeve 18 is staked at suitable intervals to provide stops 50 which prevent movement of the bearings to the right, as viewed in Fig. 2.

The bearings 42 and 44 are provided with oil slots 52 which communicate with the wick 48. Oil is delivered to the oil slots and to the wick through a sleeve 54 carried by, or formed in, the shell 14, and preferably provided with a wick 56. The front end of the shaft is provided with a disc 58 which prevents oil creeping along the shaft from reaching the opening 30 or the bushing 38.

The shaft 32 is prevented from moving to the right, as viewed in Fig. 2, by means of one or more washers 60 which have round holes adapted to fit the rear round portion of the shaft and which abut the adjacent end of the rear bearing 44. The rear end of the shaft is cut away to provide a portion having an flat surface 62, this portion being engaged by a washer 64 having a D-shaped hole formed therein. The shaft 32 is locked against longitudinal movement relative to the washers 60 and 62 by means of a split spring ring 66 engaging a groove 68 formed in the flattened rear end of the shaft.

According to my invention, the end thrust of the shaft 32 is resisted by a bearing 70 having a sliding fit within the bore 26 of the bearing sleeve 18. The bearing 70 is biased in the direction of the shaft 32 by a flat or leaf spring 72, one end of which is fixedly secured to the enlarged portion 20 of the bearing sleeve 18 by a screw 74. The force of the spring is regulated by means of a screw 76 engaging the other end of the spring and the enlarged portion of the bearing sleeve. The spring 72 is accessible for adjustment through an opening 78 formed in the rear end of the shell 16 and normally closed by a cap 80.

The bearing 70 of my invention is preferably in the nature of a cylindrical plug formed of a porous oil-impregnated alloy, such as bronze or the like. The inner side of the bearing, or the side thereof adjacent the end of the shaft 32 is provided with a spherical surface 82 which engages a spherical surface 84 formed at the rear end of the shaft 32. The spherical surface 82 of the bearing is preferably of a larger diameter than of the spherical surface 84 of the shaft. On its opposite side the bearing 70 is provided with a finger or projection 86 which is provided with a small diameter spherical surface 88 which is concentric with the axis of rotation of the motor shaft and against which the adjusting spring 72 abuts.

*Assembly*

When the motor and the shaft are completely assembled as shown, the bearing 70 is inserted into the bore 26 and the spring 72 is adjusted to move the bearing 70 towards the end of the shaft until the desired clearance, such, for example, .005″, is left between the end of the shaft and the adjacent surface of the bearing.

*Operation*

As the shaft rotates, the thrust of the propeller tends to move the shaft to the left, as viewed in Fig. 2, so that the spherical surface 84 of the shaft abuts against the adjacent spherical surface 82 of the bearing which is yieldingly biased by the adjustable spring 72 against the end of the shaft. The yielding of the spring prevents binding of the shaft which may result from expansion of the shaft if it were confined between fixed bearings.

By providing the spherical surface 84 at the end of the shaft and the spherical surface 82 on the adjacent face of the bearing, the contact between the shaft and the bearing is in the nature of a point contact, thus greatly reducing friction. Also, by providing the small diameter spherical surface 88 against which the flat spring abuts, the bearing 70 is held in a position which is concentric with the axis of rotation of the shaft, thus preventing tilting and consequent binding of the bearing.

While I have shown my invention in but one form, it will be obvious to those skilled in the art that it is not so limited, but is susceptible of various changes and modifications without departing from the spirit thereof.

What I claim is:

1. In combination, a sleeve member having a bore, fixed bearings in said bore, a shaft rotatable in said bearings, and means for resisting the end thrust of said shaft, said means including a bearing slidable in said sleeve member adjacent one end of said shaft and having a large diameter curved surface for contacting said one end of said shaft, said bearing having a small diameter surface on the side thereof removed from said shaft, and an adjustable flat spring engaging said small diameter surface at a point located on the axis of said extended shaft, said end of said shaft having a small diameter curved surface adapted to abut against said large diameter curved surface of said bearing.

2. In combination, a sleeve member having a bore, a fixed bearing mounted therein, a shaft rotatively mounted in said fixed bearing and having a rounded end disposed within said bore, retainer means secured on said end of the shaft for freely engaging said fixed bearing to limit axial displacement of said shaft in one direction, and yieldable means for resisting the end thrust of said shaft in the other direction including a movable bearing larger in diameter than said shaft and slidably mounted in said bore adjacent said rounded end of the shaft, said movable bearing having a rounded surface of relatively large diameter engageable with said smaller rounded end of the shaft at the axis thereof and also having an axially disposed boss portion formed on the side remote from said shaft, and an adjustable flat spring mounted on said sleeve in yieldable engagement with said boss portion.

GUSTAV H. KOCH.

REFERENCES CITED

The following references are of record in the file of this patent:

UNITED STATES PATENTS

| Number | Name | Date |
|---|---|---|
| 2,396,462 | Grace et al. | Mar. 12, 1946 |
| 1,071,989 | Dehu | Sept. 2, 1913 |
| 1,856,943 | Bonsieur | May 3, 1932 |
| 2,337,795 | Austin | Dec. 28, 1943 |
| 2,248,711 | Le Fevre | July 8, 1941 |
| 1,618,877 | Henry | Feb. 22, 1927 |
| 1,667,172 | Sparks | Apr. 24, 1928 |